March 12, 1929.  C. C. HALLOWELL  1,704,856

CONNECTING BAR FOR DENTURES

Filed Sept. 21, 1923  2 Sheets-Sheet 1

Inventor
Clifton C. Hallowell,
Clifton C. Hallowell
Attorney

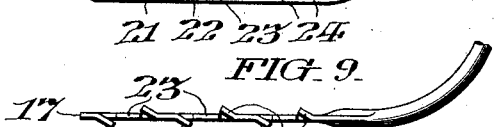
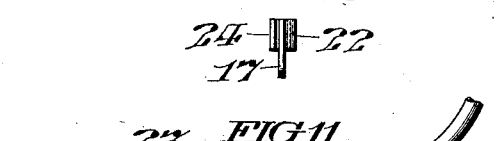
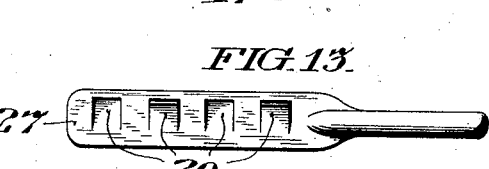
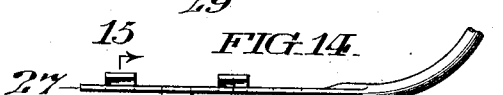
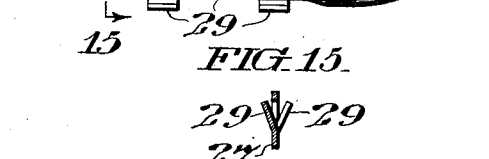
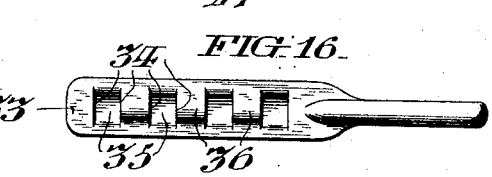
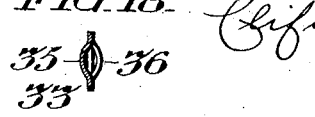

Patented Mar. 12, 1929.

1,704,856

UNITED STATES PATENT OFFICE.

CLIFTON C. HALLOWELL, OF PENFIELD, PENNSYLVANIA, ASSIGNOR TO THE S. S. WHITE DENTAL MANUFACTURING COMPANY, A CORPORATION OF PENNSYLVANIA.

CONNECTING BAR FOR DENTURES.

Application filed September 21, 1923. Serial No. 663,938.

My invention relates particularly to lingual or palatal bars that are designed to connect partial dentures which are disposed upon opposite sides of the mouth, and is especially directed to the form of the bar terminals with which said dentures are to be engaged.

The principal objects of my invention are to provide a denture connecting bar with denture attaching terminals so formed as to not only afford means for providing rigid attachment for the plastic material forming the denture, but which also affords a construction whereby said plastic material may be readily packed into the interstices provided to receive it.

Other objects of my invention are to provide a denture connecting bar having its denture attaching terminals so formed as to be capable of attachment with dentures composed of either plastic material or of metal with equal facility.

My invention comprehends a denture connecting bar having denture attaching terminals that may be readily modified by the operator to conform to specific conditions that may be encountered.

Specifically stated, the form of my invention as hereinafter described, comprises a denture connecting bar of any desired cross-section, having its medial arch bowed to conform generally to the medial arch of the human mandible, and its terminal portions extended to conform to the lateral extremities of said arch, and flattened to form terminal webs arranged to be attached to the dentures, and having their edges provided with slits, such as scissors cuts, or knife blade incisions extended into the body of said webs and affording fins arranged to be alternately extended obliquely upon opposite sides of the plane thereof to insure rigid engagement of said dentures therewith.

Figure 1:
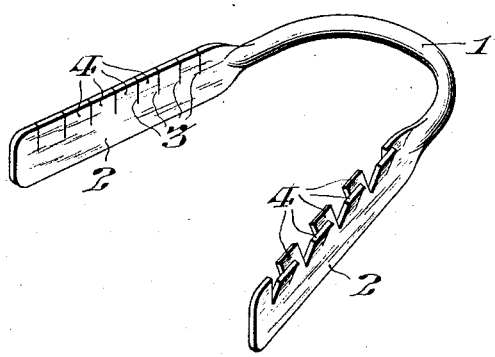
Figure 2:
Figure 3:
Figure 4:
Figure 5:
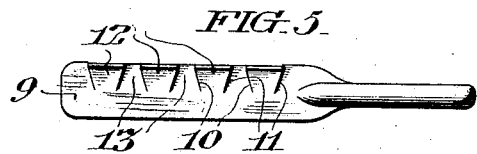
Figure 6:
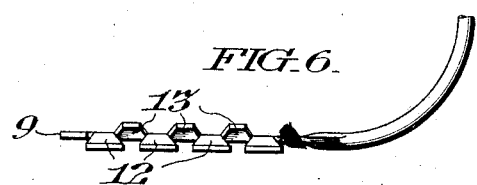
Figure 7:
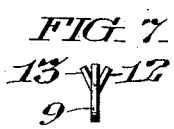

In the accompanying drawings, Figure 1 is a perspective view of a denture connecting bar conveniently embodying my invention and showing the fins of one terminal web disposed in the plane thereof, and the other having the fins extended obliquely to said plane, alternately upon opposite sides thereof; Fig. 2 is a side elevational view showing a modification of the structure illustrated in Fig. 1; Fig. 3 is a fragmentary plan view of the modification shown in Fig. 2; Fig. 4 is an end elevational view of the structure shown in Figs. 2 and 3, as viewed from the left of said figures; Fig. 5 is a side elevational view of another modified form of my invention; Fig. 6 is a fragmentary plan view of the form of my invention shown in Fig. 5; Fig. 7 is an end elevational view of the structure shown in Figs. 5 and 6, as viewed from the left of said figures; Fig. 8 is a side elevational view of another modified form of denture connecting bar embodying my invention; Fig. 9 is a fragmentary plan view showing a possible form, of which the structure shown in Fig. 8 is capable of taking; Fig. 10 is an end elevational view of the structure shown in Fig. 9, as viewed from the left of said figure; Fig. 11 is a fragmentary plan view showing another possible form which the structure shown in Fig. 8 may assume; Fig. 12 is an end elevational view of the structure shown in Fig. 11, as viewed from the left of said figure; Fig. 13 is a side elevational view of a further modified form of denture connecting bar embodying my invention; Fig. 14 is a fragmentary plan view of the denture connecting bar shown in Fig. 13; Fig. 15 is a transverse vertical sectional view of the structure shown in Fig. 14, taken on the line 15—15 in said figure; Fig. 16 is a side elevational view of another modified form of denture connecting bar embodying my invention; Fig. 17 is a fragmentary plan view of the structure shown in Fig. 16; and Fig. 18 is a transverse vertical sectional view of the denture connecting bar shown in Fig. 17, taken on the line 18—18 in said figure.

In the form of my invention shown in Fig. 1, the denture connecting bar 1 may be of any desired cross-section, preferably lentiform or ovalescent and bowed to substantially conform to the medial region of the dental arch of the human mandible, being provided with denture attaching terminals 2 diverging distally and arranged to be embedded in, or otherwise attached to, the saddle portion of dentures of well-known form, which may be composed of vulcanite, metal or other suitable material.

Said denture attaching terminal webs 2 are provided along their edges with transversely extended slits 3, forming a plurality of separate fins 4, which, as shown in the right hand terminal 2 of the bar 1, may be deflected from the plane of said web in any desired order, preferably alternately outward and inward, obliquely from said plane. The fins 4, thus deflected, afford means for retaining the terminals 2 in rigid engagement with the dentures which are to be connected by the denture connecting bar 1.

In the form of my invention shown in Figs. 2, 3 and 4, the terminal webs 5 are provided with transversely extended slits 6 which are slightly inclined to form the substantially rhomboidal-shaped fins 7, which, when deflected laterally from the plane of the terminal webs 5, as shown in Figs. 3 and 4, tend to incline forwardly and therefore assume an angular position in variable directions with respect to the body of the terminal webs 5, thus augmenting the retentive effect of said fins.

In the form of my invention shown in Figs. 5, 6 and 7, the terminal webs 9 are provided with slits 10 and 11, which respectively incline in opposite directions from the edge of said webs inwardly, and afford wedge-shaped fins 12 and 13, the former broadening outwardly, and the latter narrowing toward its free edge, and, as best shown in Figs. 6 and 7, said fins may be deflected alternately inwardly and outwardly from the plane of said terminal webs 9, to afford means of retention of said webs, with the dentures which are to be connected.

In the form of my invention shown in Figs. 8, 9, 10, 11 and 12, the denture connecting bar has its terminal webs 17, provided with the transverse slits 18 having longitudinal extensions 19 directed rearwardly in said webs, and the slits 20 having longitudinal extensions 21 directed forwardly in said webs, cooperative to form separate fins 22, 23 and 24, which may be deflected from the plane of the terminal webs 17, as shown in Fig. 9, wherein the fins 22 are deflected outwardly and the fins 24 deflected inwardly upon opposite sides of the plane of the webs 17, while the fins 23 remain in the plane of the webs 17, or, as shown in Figs. 11 and 12, the fins 22 and 24 may be deflected outwardly and the fins 23 deflected inwardly about relatively normal axes, to provide rigid engagement of said terminal webs with the dentures which are to be connected.

In the form of my invention shown in Figs. 13, 14 and 15, the denture connecting bar is provided with the terminal webs 27, having punched from the body thereof, between its edges, the fins 29, which may be alternately extended obliquely inwardly and outwardly with respect to the plane of said terminal web 27, as shown in Figs. 14 and 15.

In the form of my invention shown in Figs. 16, 17 and 18, the denture connecting bar is provided with the terminal webs 33, having the transverse slits 34 which permit the intervening metal to be punched outwardly and inwardly from the plane of the terminal web 33 to form looped projections 35 and 36, which afford means for rigidly engaging the dentures which are to be connected.

My invention is advantageous in that the fins projecting from the terminal webs may be variably distorted to any desired degree conformable to each particular denture of vulcanite or other suitable material, or may be extended in the plane of the body of the terminal webs, in which form said bar is especially adapted to be engaged with metal dentures by having the terminal webs soldered thereto.

It may be here noted that the fin forming slits may be differently disposed, and that the fins herein shown may be variably distorted to positions not herein illustrated, and therefore I do not desire to limit my invention to the precise details of construction and arrangement herein set forth, as it is obvious that various modifications may be made therein without departing from the essential features of my invention as defined in the appended claims.

Having thus described my invention, I claim:

1. A device of the class described, comprising a bar terminating in flattened elongated webs having their edges slitted to form separate fins which normally preserve the continuity of the slitted edge, and which when alternately bent laterally, form a continuous V-shaped groove.

2. A device of the class described, comprising a bar provided with flattened terminal webs, having their edges slitted transversely to form separate closely adjacent fins alternately extended angularly upon opposite sides of the plane of said webs.

3. A device of the class described, comprising a bar terminating in flattened, elongated webs having transversely directed slits forming relatively movable web portions capable of being extended upon opposite sides of the planes of said webs, the alternately disposed web portions being oppositely tapered.

4. A device of the class described, comprising a bar provided with elongated terminal webs having inclined relatively parallel slits forming fins disposed between the opposite edges of said webs and arranged to be alternately bent in opposite lateral directions upon a longitudinal axis.

5. A device of the class described, comprising a bar provided with elongated terminal webs having relatively inclined slits forming closely adjacent fins arranged to be alternately bent in opposite lateral directions in relatively intersecting planes.

6. A device of the class described, comprising a bar provided with elongated terminal webs each having separate fins bent about relatively directed axes.

In witness whereof, I have hereunto set my hand this 20th day of September, A. D. 1923.

CLIFTON C. HALLOWELL.